(12) United States Patent
Fujiuchi et al.

(10) Patent No.: US 8,620,637 B2
(45) Date of Patent: Dec. 31, 2013

(54) FUEL CELL SIMULATOR AND FUEL CELL

(75) Inventors: Makoto Fujiuchi, Toyota (JP); Atsushi Ida, Nissin (JP); Takashi Harada, Toyota (JP); Tadashi Kawamoto, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 425 days.

(21) Appl. No.: 12/867,358

(22) PCT Filed: Feb. 12, 2009

(86) PCT No.: PCT/JP2009/052270
§ 371 (c)(1),
(2), (4) Date: Aug. 12, 2010

(87) PCT Pub. No.: WO2009/101955
PCT Pub. Date: Aug. 20, 2009

(65) Prior Publication Data
US 2010/0323279 A1 Dec. 23, 2010

(30) Foreign Application Priority Data
Feb. 12, 2008 (JP) ................................. 2008-029928

(51) Int. Cl.
*G06F 7/60* (2006.01)
*G06F 17/50* (2006.01)
*H01M 4/02* (2006.01)

(52) U.S. Cl.
USPC ................................. 703/13; 703/2; 429/523

(58) Field of Classification Search
None
See application file for complete search history.

(56) References Cited

U.S. PATENT DOCUMENTS

| 7,194,367 | B2* | 3/2007 | Baker | 702/85 |
|---|---|---|---|---|
| 7,698,119 | B2* | 4/2010 | Yu et al. | 703/13 |
| 7,844,434 | B2* | 11/2010 | Wang et al. | 703/13 |
| 2003/0138688 | A1* | 7/2003 | Hattori et al. | 429/34 |
| 2005/0091023 | A1* | 4/2005 | Fujiuchi et al. | 703/13 |
| 2006/0216564 | A1* | 9/2006 | Arcella et al. | 429/32 |

FOREIGN PATENT DOCUMENTS

| JP | 6188020 A | 7/1994 |
|---|---|---|
| JP | 6333605 A | 12/1994 |
| JP | 2003166937 A | 6/2003 |

(Continued)

OTHER PUBLICATIONS

An Electrochemical-Based Fuel-Cell Model Suitable for Electrical Engineering Automation Approach. Jeferson M. Corrêa et al. IEEE Transactions on Industrial Electronics, vol. 51, No. 5, Oct. 2004.*

(Continued)

*Primary Examiner* — Omar Fernandez Rivas
*Assistant Examiner* — Nithya J Moll
(74) *Attorney, Agent, or Firm* — Gifford, Krass, Sprinkle, Anderson & Citkowski, P.C.

(57) ABSTRACT

Disclosed is a fuel cell simulator for predicting the power generation performance of a fuel cell including a membrane-electrode assembly having an electrolyte membrane, a catalyst layer, and a diffusion layer. The fuel cell simulator includes a model creation unit for modeling a catalyst layer from the geometry and property data of the catalyst layer, and a calculation unit for calculating the power generation state distribution of the catalyst layer or macro physical property values by using the catalyst layer model and establishing simultaneous equations of gas transportation, water production-transportation phase change, electrical conduction, heat conduction, and catalytic reaction.

9 Claims, 3 Drawing Sheets

(56) References Cited

FOREIGN PATENT DOCUMENTS

| | | |
|---|---|---|
| JP | 2004014331 A | 1/2004 |
| JP | 2005135814 A | 5/2005 |
| JP | 2005285353 A | 10/2005 |
| JP | 2006202735 A | 8/2006 |
| JP | 2007095620 A | 4/2007 |
| JP | 2007323852 A | 12/2007 |

OTHER PUBLICATIONS

Guoqing Wang, Partha P. Mukherjee, Chao-Yang Wang, "Direct numerical simulation (DNS) modeling of PEFC electrodes Part II. Random microstructure", Electrochemical Acta, Apr. 1, 2006, vol. 51, issue 15, pp. 3151-3160.

Hyunchul Ju, Chao-Yang Wang, Simon Cleghorn, and Uwe Beuscher, "Nonisothermal Modeling of Polymer Electrolyte Fuel Cells I. Experimental Validation", Journal of the Electrochemical Society, 152(8) A1645-A1653 (2005).

Z.H. Wang, C.Y. Wang, and K.S. Chen "Two-phase flow and transport in the air cathode of proton exchange membrane fuel cells" Journal of Power Sources 94 (2001) 40-50.

Partha P. Mukherjee, Chao-Yang Wang, "Stochastic Microstructure Reconstruction and Direct Numerical Simulation of the PEFC Catalyst Layer", Journal of the Electrochemical Society, vol. 153, No. 5 (2006), A840-A849.

Notice of Grounds for Rejection issued in the basic Japanese Application No. 2008-29928 on May 19, 2009 along with English translation.

* cited by examiner

FUEL CELL SIMULATOR AND FUEL CELL

CROSS-REFERENCE TO RELATED APPLICATIONS

This application is the U.S. national phase of PCT/JP2009/052270 filed Feb. 12, 2009, which claims priority of Japanese Patent Application No. 2008-029928 filed Feb. 12, 2008.

TECHNICAL FIELD

The present invention relates to a fuel cell simulator for predicting power generation performance of a fuel cell, and a fuel cell which is designed by using a prediction result of the fuel cell simulator.

BACKGROUND ART

As one of the countermeasures against environmental problems in recent years, in particular global warming associated with air pollution and generation of carbon dioxide caused by gas emission of motor vehicles, fuel cell technologies which enable clean emission and highly energy-efficient driving have attracted attention. A fuel cell is formed of a membrane-electrode assembly including an electrolyte membrane, a pair of catalyst layers sandwiching the electrolyte membrane, and a pair of diffusion layers further sandwiching both outer surfaces of the catalyst layers, and a pair of fuel cell separators disposed on both outer surfaces of the membrane-electrode assembly.

Because the above-described elements forming a fuel cell are expensive, simulation technologies are being widely used for designing and manufacturing a fuel cell. (See Patent Documents 1 and 2, for example)

Particularly, with regard to a catalyst layer among the elements forming a fuel cell, effective use of simulation technologies is of great significance because a catalyst layer is an important element which determines properties of a fuel cell. However, if simulation is performed with the assumption that the structure of a catalyst layer is a "homogeneous porous medium" for the purpose of simplification of operation processing at the time of simulation and other purposes, actual properties and behaviors of a catalyst layer cannot be identified, which makes it difficult to predict the power generation performance of a fuel cell with high accuracy by means of the simulation.

Patent Document 1: JP 2005-135814 A
Patent Document 2: JP 2007-95620 A

DISCLOSURE OF THE INVENTION

Technical Problems

It is therefore an advantage of the present invention to provide a fuel cell simulator which is capable of predicting power generation performance of a fuel cell based on the actual structure (e.g. heterogeneous porous medium) of a catalyst layer.

Solution to Problems (1) In accordance with an aspect of the invention, there is provided a fuel cell simulator for predicting power generation performance of a fuel cell including a membrane-electrode assembly having an electrolyte membrane, a catalyst layer, and a diffusion layer, the fuel cell simulator comprising a model creation unit for modeling the catalyst layer from geometry and property data of the catalyst layer, and a calculation unit for calculating at least one of power generation state distribution and macro physical property values of the catalyst layer by using the catalyst layer model and establishing simultaneous equations for gas transportation, water production transportation phase change, electrical conduction, heat conduction, and catalytic reaction.

(2) Preferably, in the above cell simulator described in (1), the model creation unit models the electrolyte membrane and the diffusion layer from geometry and property data of the electrolyte membrane and the diffusion layer, and a calculation unit calculates at least one of power generation state distribution and macro physical property values of the electrolyte membrane and the diffusion layer by using an electrolyte membrane model and a diffusion layer model and establishing simultaneous equations for gas transportation, water production transportation phase change, electric conduction, heat conduction, and catalytic reaction.

(3) Preferably, in the above cell simulator described in (2), the model creation unit performs modeling from a material composition ratio and material physical properties of the catalyst layer, the electrolyte membrane, and the diffusion layer, in addition to the geometry and the property data thereof.

(4) Preferably, in the above cell simulator described in any one of (1) to (3), a micro two-phase flow model is used for the equations of gas transportation and water production transportation phase change.

(5) Preferably, in the fuel cell simulator described in (3), a molecule model by means of quantum molecular dynamics calculation is used in place of the material physical property data.

(6) Preferably, in the fuel cell simulator described in (2), the calculation unit introduces a time parameter in each of the equations to calculate dynamic properties of the power generation state distribution of the catalyst layer, the electrolyte membrane, and the diffusion layer.

(7) Preferably, the fuel cell simulator described in (2) includes a repetition unit which causes the model creation unit to repeat modeling and causes the calculation unit to repeat calculation by varying the geometry and the property data such that a difference between a calculation result by the calculation unit and a target value is a predetermined value or less.

(8) Preferably, in accordance with another aspect of the present invention, there is provided a fuel cell including a membrane-electrode assembly having an electrolyte membrane, a pair of catalyst layers sandwiching the electrolyte membrane, and a pair of diffusion layers sandwiching both outer surfaces of the pair of catalyst layers, wherein the catalyst layer has geometry and physical property data determined based on a result of power generation state distribution of the catalyst layer which is calculated by the fuel cell simulator described in (1).

Advantageous Effects of Invention

According to the present invention, it is possible to provide a fuel cell simulator which is capable of analyzing a catalyst layer based on the actual physical structure (e.g. a heterogeneous porous medium) of the catalyst layer to predict the power generation performance of a fuel cell.

BRIEF DESCRIPTION OF THE DRAWINGS

These and other objects of the invention will be explained in the description below, in connection with the accompanying drawings, in which.

REFERENCE SIGN LIST 1, 2 fuel cell simulator, 3 fuel cell, 10 input unit, 12, 30 CPU, 14 output unit, 16 model creation module, 18 calculation module, 20 electrolyte membrane, 22 carrier, 24 catalyst layer, 26 diffusion layer, 28 membrane-electrode assembly model, 32 repetition module, 34 electrolyte membrane, 36 catalyst layer, 38 diffusion layer, 40 membrane-electrode assembly, 42 fuel cell separator, 44 fluid passage, 46 adhesive.

BEST MODE FOR CARRYING OUT THE INVENTION

Preferred embodiments of the present invention will be described with reference to the drawings.

Figure 1:
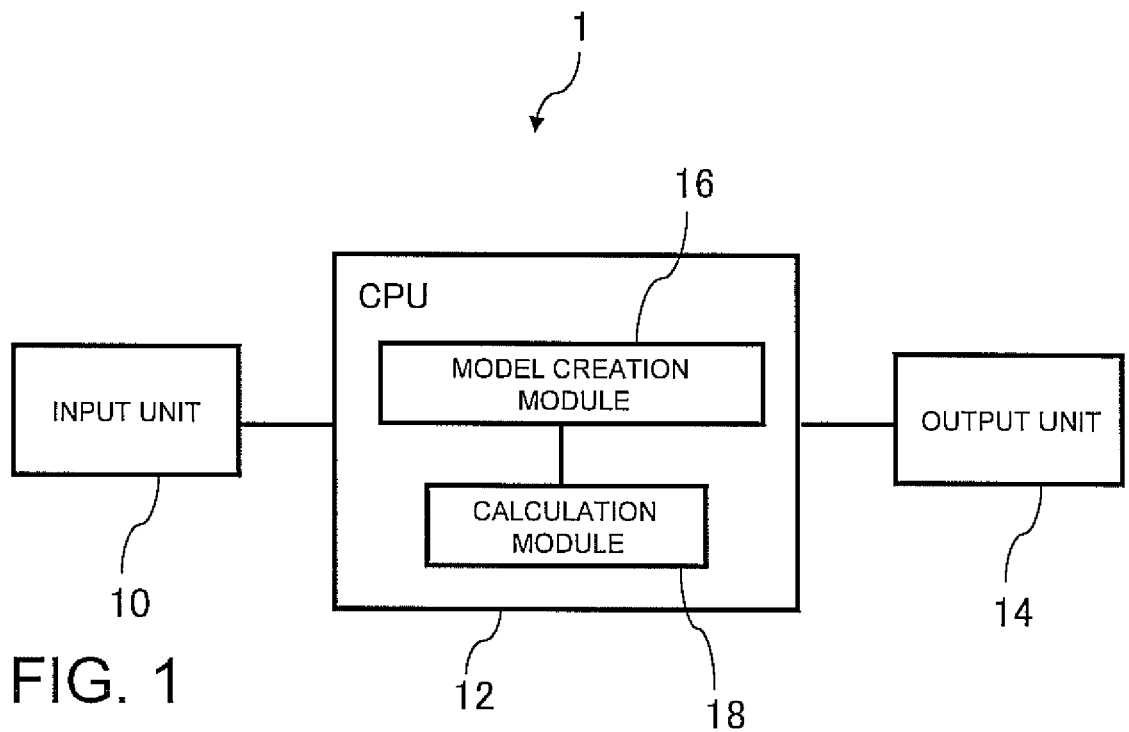
FIG. 1 is a view schematically illustrating an example structure of a fuel cell simulator according to an embodiment of the present invention.

FIG. 1 is a view schematically illustrating an example structure of a fuel cell simulator according to an embodiment of the present invention. As illustrated in FIG. 1, a fuel cell simulator 1 includes an input unit 10 such as a keyboard for inputting geometry and property value data of a catalyst layer, an electrolyte membrane, and a diffusion layer (which will, in some instances, be collectively referred to as a catalyst layer and so on), a CPU 12 which executes operation processing, and an output unit 14 such as a display for outputting a calculation result.

The CPU 12 includes a model creation module 16 for modeling the catalyst layer and so on from geometry and property data of the catalyst layer and so on. The model creation module 16 of the CPU 12 uses 3D solid CAD such as CATIA or a voxel method to model the catalyst layer and so on from the geometry and physical property data of the catalyst layer and so on input through the input unit 10. While, according to the present embodiment, it is possible to predict the power generation performance of a fuel cell only from the geometry and physical property data of the catalyst layer, modeling of a membrane-electrode assembly can be performed by additionally using the geometry and physical property data of the electrolyte membrane and the diffusion layer, so that the power generation performance of a fuel cell can be predicted with higher precision. The geometry data of the catalyst layer and so on includes geometry data which is necessary for the modeling or for the equations described below. Specifically, the geometry data of the catalyst layer includes, for example, the particle size and carrier density of a catalyst metal such as platinum forming the catalyst layer, the particle size of a carbon forming the catalyst layer, the ionomer ratio (I/C), the catalyst layer thickness, the pore size distribution, and so on. Further, the geometry data of the electrolyte membrane includes, for example, the electrolyte membrane thickness, the surface property (roughness), and so on, and the geometry data of the diffusion layer includes, for example, the thickness of the diffusion layer, the ratio of hydrophilicity/hydrophobicity, the pore size distribution, and so on, of the diffusion layer. While SEM image data and TEM image data of the catalyst layer, the electrolyte membrane, and the diffusion layer can be used as the geometry data, numerical value data is preferable to image data as the geometry data in that the processing time for modeling can be reduced.

The property data of the catalyst layer and so on includes physical property data which is necessary for the modeling and for the equations described below. The property data of the catalyst layer includes, for example, the pore size distribution, the hydrophilic/hydrophobic pore distribution, the capillary pressure properties, and so on. The property data of the electrolyte membrane and the diffusion layer is similar to the data described above.

In order to enable prediction of the power generation performance with high accuracy, it is preferable to perform modeling of the catalyst layer and so on by using the material composition ratio and the material property data of the catalyst layer and so on in addition to the geometry and property data described above. A catalyst layer is formed by mixing carbon carrying a metal catalyst, such as platinum and ruthenium, with a perfluorosulfonic acid electrolyte and so on to form a film. Specifically, the material composition ratio data of the catalyst layer and so on refers to a ratio of materials forming the catalyst layer. Further, the material property data of the catalyst layer refers to the physical properties of materials forming the catalyst layer described above, and includes, for example, the catalytic activity (exchange current density), heat conductivity, electronic conductivity, proton conductivity, and so on. While a porous material such as carbon fiber and so on is used for the diffusion layer, if water repellent or the like is applied to a surface of the porous material, the material composition ratio refers to a ratio of the porous material and the water repellant, and so on. Also, the material property data of the diffusion layer refers to physical properties of the materials forming the diffusion layer as described above, and includes, for example, heat conductivity, electronic conductivity, etc. The electrolyte membrane is a membrane having a proton conductivity, and a perfluorosulfonic acid resin membrane or the like is used. However, if the electrolyte membrane is a composite membrane of a perfluorosulfonic acid resin, the material composition ratio data refers to a ratio of a resin which is used, for example. Further, the material property data of the electrolyte membrane refers to physical property data of a resin or the like which is used, and includes heat conductivity, proton conductivity, and so on.

Figure 2:
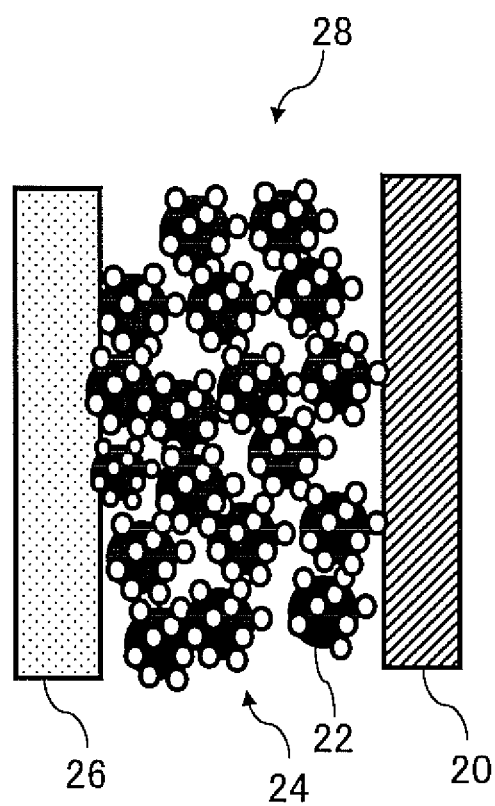
FIG. 2 is a view illustrating a membrane-electrode assembly which is modeled by a model creation module.

FIG. 2 illustrates a catalyst layer-electrolyte membrane-diffusion layer model (which may be, for some instances, referred to a membrane-electrode assembly model) which is modeled by the model creation module 16 from the geometry and property data of the catalyst layer etc. Generally, a membrane-electrode assembly includes an electrolyte membrane, a pair of catalyst layers sandwiching the two sides of the electrolyte membrane, and a pair of diffusion layers sandwiching the two outer sides of the catalyst layers. According to the present embodiment, in order to avoid load of the subsequent operation processing, a model including an electrolyte membrane 20, and a catalyst layer 24 having carriers 22, such as carbon carrying catalyst such as platinum, and a diffusion layer 26, which are provided on one surface of the electrolyte membrane 20, is created as a membrane-electrode assembly model 28. However, the model used in the present embodiment is only one example, and the present invention is not limited to this example and may use a three-dimensional membrane-electrode assembly model, for example.

As illustrated in FIG. 1, the CPU 12 includes a calculation module 18 which calculates the power generation state distribution or macro physical properties of the catalyst layer and so on by using the membrane-electrode assembly model created by the model creation module 16 and establishing the following simultaneous equations. Here, the power generation state distribution refers to distribution of gas supplied to a fuel cell, and of water, heat (temperature), and electricity (current) generated by power generation of the fuel cell in the catalyst layer, the diffusion layer, and the electrolyte membrane. The distribution of water and gas in the catalyst layer is obtained by the gas transportation equation and the water production-transportation phase change equation as will be described below, the temperature distribution is obtained by the heat conduction equation described below, and the current distribution is obtained by the electric conduction equation and the catalytic reaction equation described below. Further, the macro physical properties refer to the ion conductivity (resistance overvoltage), the diffusion overvoltage, the diffusion coefficient (gas, water), and the transmission coefficient (gas, water). In the present embodiment, the calculation module 18 calculates at least one of the power generation state distribution and the macro physical properties of the catalyst layer and so on.

The calculation module 18 of the CPU 12 calculates the power generation state distribution and the macro physical properties of the catalyst layer and so on by means of the gas transportation equation, the water production-transportation phase change equation, the electrical conduction equation, the heat conduction equation, and the catalyst equation, using the membrane-electrode assembly model created by the model creation module 16 and the operation conditions (current, temperature, humidity, pressure, and so on) of a fuel cell stored in the calculation module, which are necessary for the above equations.

The gas transportation equation refers to a law of mass conservation, a law of momentum conservation, and a law of substance amount conservation, and is represented by the following expressions (1) to (3):

$$\nabla \cdot (\rho u)=0 \tag{1}$$

wherein $\rho$ represents a concentration of gas fluid, and u represents a velocity of gas fluid;

$$1/\epsilon^2 \nabla \cdot (\rho uu)=-\nabla P+\nabla\tau+S_u \tag{2}$$

wherein P represents a distribution of pressure of gas fluid, $\tau$ represents gas shear force, and $S_u$ represents a body force acting on a gas fluid element; and $$\nabla \cdot (uC_k)=\nabla \cdot (D_k^{\mathit{eff}}\nabla C_k)+S_k \tag{3}$$

wherein $C_k$ represents a distribution of gas fluid concentration, $D_k^{\mathit{eff}}$ represents an effective diffusion coefficient, and $S_k$ represents gas generation and consumption caused by a chemical reaction.

The electrical conduction equation refers to a law of conservation of charge, and is represented by the following expression (4):

$$\nabla \cdot (K^{\mathit{eff}}\nabla \Phi_e)+S_\Phi=0 \tag{4}$$

wherein $K^{\mathit{eff}}$ represents an effective electric conductivity, $\Phi_e$ represents a potential, and $S_\Phi$ represents generated current.

The heat conduction equation refers to a law of energy conservation, and is represented by the following expression (5):

$$\nabla \cdot (\rho c_p uT)=\nabla \cdot (k^{\mathit{eff}}\nabla T)+S_T \tag{5}$$

wherein T represents a temperature distribution, $c_p$ represents a specific heat, $k^{\mathit{eff}}$ represents an effective heat conductivity, and $S_T$ represents heat generation(exotherm) and heat adsorption(endotherm).

The catalytic reaction equation is an electrochemical reaction and is represented by the following expression (6):

$$\Sigma s_k M_k^z = n\ e^- \tag{6}$$

wherein $M_k$ represents a chemical expression, $s_k$ represents a stoichiometric coefficient, and n represents the amount of charge transfer.

The electrochemical reaction is based on the following expressions:

Anode electrode: $H_2 \rightarrow 2H^+ + 2e^-$
Cathode electrode: $1/2 O_2 + 2H^+ + 2e^- \rightarrow H_2O$ The water production-transportation phase change equation is represented by the following expressions (7) to (9):

$$\partial(\epsilon\rho)/\partial t + \nabla \cdot (\epsilon\rho u)=0 \tag{7}$$

$$\partial(\epsilon\rho u)/\partial t + \nabla \cdot (\epsilon\rho uu)=\partial(\epsilon\mu\nabla u)-\epsilon\nabla P+\epsilon\rho_k g - \epsilon^2 \cdot \mu/K \cdot u \tag{8}$$

$$\partial/\partial t(\epsilon\rho C)+\nabla \cdot (\epsilon v_c \rho u C)=\nabla \cdot (\epsilon \rho D \nabla C)+\nabla \cdot \{\epsilon(\rho_l s D_l \nabla C_l + \rho_g(1-s)D_g \nabla C_g - \rho D \nabla C)\} - \nabla \cdot ((C_l - C_g)j_l) \tag{9}$$

wherein g represents gravity, K represents a transmission coefficient, $C_l$ represents water concentration gradient, $C_g$ represents gas concentration gradient, $D_l$ represents a water diffusion coefficient, $D_g$ represent a gas diffusion coefficient, and $v_c$ represents a coefficient of kinematic viscosity.

The power generation state distribution and the macro physical properties of the catalyst layer and so on which are obtained by the calculation module 18 of the CPU 12 are displayed by the output unit 14 in a visible manner in the form of numerical values, a graph, and a distribution chart.

According to the present embodiment, it is preferable that a micro two-phase flow model by means of Lattice Boltzmann Method (LBM), Lagrangian Method, and so on, is read by the calculation module 18 of the CPU 12, and the micro two-phase flow model is used to obtain the distribution of water and gas in the catalyst layer and so on based on the gas transportation equation and the water production-transportation phase change equation. In such operation processing, software such as Fluent (Registered Mark), STAR-CD, and so on is preferably used, for example, so that the operation processing rate and accuracy can be increased.

It is also preferable that software such as MOPAC2002 (manufactured by FUJITSU LIMITED), Gaussian (Registered Mark), Dmol3 (Registered Mark), and so on is read by the calculation module 18 of the CPU 12, and the calculation module 18 uses a molecule model by means of quantum molecular dynamics calculation, in place of the material physical property data described above, and establishes the simultaneous equations described above to calculate the power generation state distribution and the macro physical properties of the catalyst layer and so on. With this structure, it is possible to calculate the power generation state distribution and the macro physical properties with high accuracy without inputting the material physical property data.

It is further preferable that the calculation module 18 of the CPU 12 introduces a time parameter into the gas transportation equation, the water production-transportation phase change equation, the electrical conduction equation, the heat conduction equation, and the catalyst equation, to obtain the dynamic properties of the power generation state distribution of the catalyst layer and so on. With this structure, it is possible to predict deteriorated portions and so on of the catalyst layer etc. In this case, the calculation module 18 may read the time parameter in advance or the time parameter may be input through the input unit 10.

Figure 3:
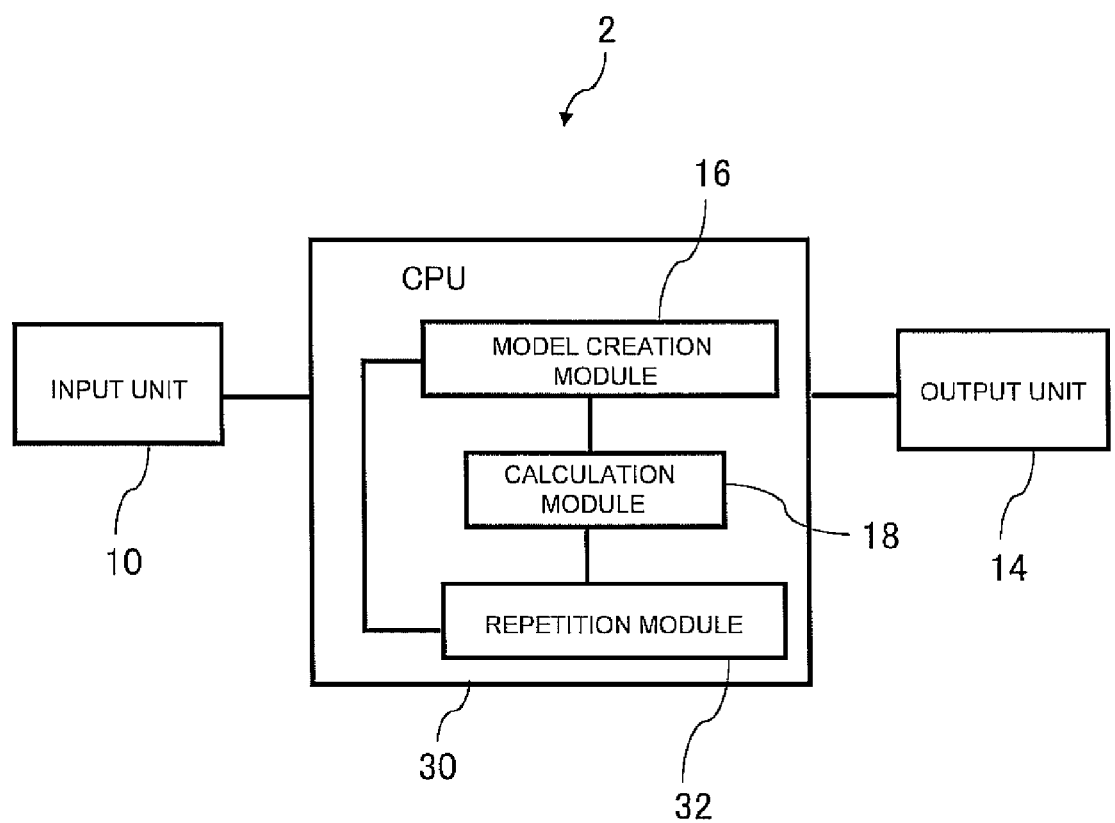
FIG. 3 is a view schematically illustrating an example structure of a fuel cell simulator according to another embodiment of the present invention.

Further, the CPU 12 preferably includes a repetition module which causes the model creation module to repeat modeling and causes the calculation module to repeat calculation by varying the geometry data and property data of the catalyst layer and so on and the material composition ratio data and the material physical property data of the catalyst layer etc., such that a difference between the power generation state distribution and the macro physical properties of the catalyst layer etc. obtained by the calculation module 18 and a predetermined target value is a predetermined value or less. FIG. 3 is a view schematically illustrating an example structure of a fuel cell simulator according to another embodiment of the present invention. As illustrated in FIG. 3, a fuel cell simulator 2 includes a repetition module 32 in a CPU 30. In the simulator 2 illustrated in FIG. 3, elements similar to those in the simulator 1 illustrated in FIG. 1 are designated by the same numerals.

The operation of the CPU 12 having the repetition module will be described with reference to the fuel cell simulator 2 illustrated in FIG. 3. First, geometry data and so on is input through the input unit 10, for example, and the model creation module 16 creates a model from the geometry data and so on. Then, the calculation module 18 uses the model and calculates the power generation state distribution etc. of the catalyst layer and so on based on the equations described above. Then, the repetition module 32, if determining that a difference between the calculated power generation state distribution and the target value recorded in the repetition module 32 is greater than a predetermined value, changes the geometry data and other data within a preset range, and provides a model creation instruction to the model creation module 16. The model creation module 16 then creates a model, and the calculation module 18 uses the model created by the model creation module 16 to calculate the power generation state distribution and so on as described above. The repetition module 32 repeats the modeling by the model creation module 16 and the calculation by the calculation module 18 until the difference between the calculation result and the target value is the predetermined value or less. As a result, optimal geometry data and property data of the catalyst layer and so on, and optimal material composition ratio data and material physical property data of the catalyst layer and so on can be obtained.

Figure 4:
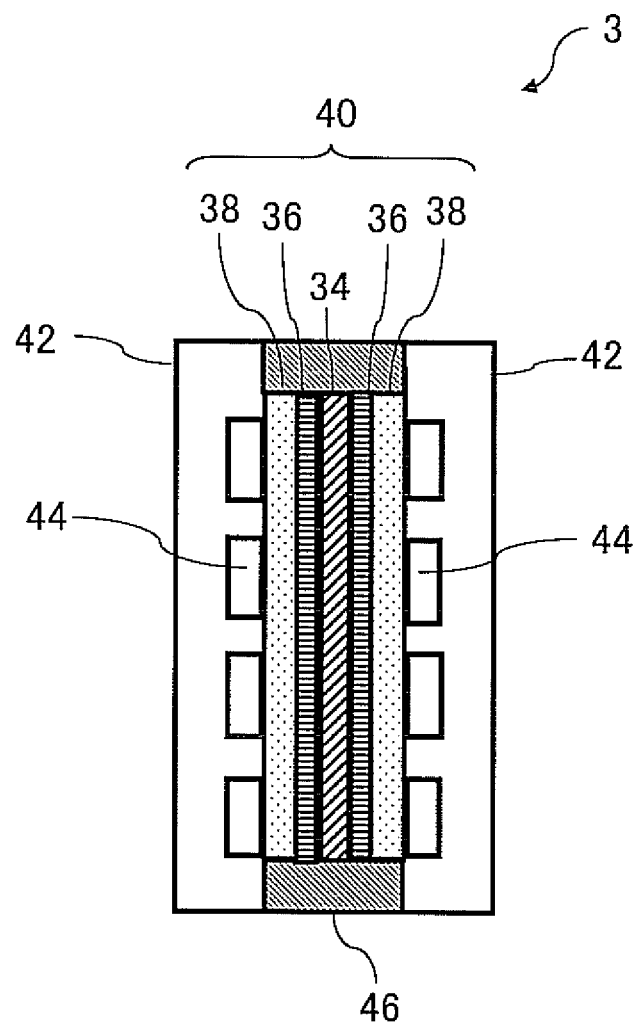
FIG. 4 is a cross sectional view schematically illustrating an example structure of a fuel cell according to the embodiment of the present invention.

FIG. 4 is a cross sectional view schematically illustrating an example structure of a fuel cell according to the embodiment of the present invention. As illustrated in FIG. 4, a fuel cell 3 includes a membrane-electrode assembly 40 having an electrolyte membrane 34, a pair of catalyst layers 36 (an anode electrode catalyst layer and a cathode electrode catalyst layer) sandwiching the electrolyte membrane 34, and a pair of diffusion layers 38 sandwiching the two outer sides of the catalyst layers 36, and a pair of fuel cell separators 42 sandwiching the two outer sides of the membrane-electrode assembly 40. A cavity portion of the fuel cell separator 42 forms a fluid passage 44 for gas (anode gas and cathode gas) used for power generation by the fuel cell. Further, the fuel cell separators are sealed together by an adhesive 46.

The electrolyte membrane 34, the catalyst layer 36, and the diffusion layer 38 which are used in the present embodiment have geometry data, property data, material composition ratio data, and material physical property data, which is determined based on the result of the power generation state distribution and the macro physical properties of the electrolyte membrane, the catalyst layer, and the diffusion layer calculated by the fuel cell simulator described above. Accordingly, a fuel cell with high power generation performance can be obtained.

INDUSTRIAL APPLICABILITY

The fuel cell according to the present embodiment can be used as a small size power source for mobile devices such as cellular phones and portable computers, a power source for motor vehicles, and a home-use power source, and so on.

The invention claimed is:

1. A fuel cell simulator for predicting power generation performance of a fuel cell including a membrane-electrode assembly having an electrolyte membrane, a catalyst layer, and a diffusion layer, the fuel cell simulator comprising:
   a CPU having a model creation unit for modeling the catalyst layer from geometry and property data of the catalyst layer, the geometry data being in the form of at least one of a particle size of a catalyst metal forming the catalyst layer, a particle size of a carbon forming the catalyst layer and an ionomer ratio; and
   the CPU also having a calculation unit for calculating at least one of power generation state distribution and macro physical property values of the catalyst layer by using a catalyst layer model and establishing simultaneous equations of gas transportation, water production transportation phase change, electric conduction, heat conduction, and catalytic reaction,
   wherein
   in the model creation unit, the geometry data is actual image data or numeric data of the catalyst layer, and the property data is actual physical property data of the catalyst layer,
   the model creation unit models the electrolyte membrane and the diffusion layer from geometry and property data of the electrolyte membrane and the diffusion layer; and
   the calculation unit calculates at least one of power generation state distribution and macro physical property values of the electrolyte membrane and the diffusion layer by using an electrolyte membrane model and a diffusion layer model and establishing simultaneous equations of gas transportation, water production transportation phase change, electric conduction, heat conduction and catalytic reaction.

2. The fuel cell simulator according to claim 1, wherein the model creation unit performs modeling from a material composition ratio and material physical properties of the catalyst layer, the electrolyte membrane, and the diffusion layer, in addition to the geometry and the property data thereof.

3. The fuel cell simulator according to claim 2, wherein a molecule model by means of quantum molecular dynamics calculation is used in place of the material physical property data.

4. The fuel cell simulator according to claim 1, wherein a micro two-phase flow model is used for the equations of gas transportation and water production transportation phase change.

5. The fuel cell simulator according to claim 1, wherein the calculation unit introduces a time parameter in each of the equations to calculate dynamic properties of the power generation state distribution of the catalyst layer, the electrolyte membrane, and the diffusion layer.

6. The fuel simulator according to claim 1, comprising:
   a repetition unit which causes the model creation unit to repeat modeling and causes the calculation unit to repeat calculation by varying the geometry and the property data such that a difference between a calculation result by the calculation unit and a target value is a predetermined value or less.

7. The fuel cell simulator according to claim 1, wherein in the power generation state distribution of the catalyst layer, the calculation unit obtains distribution of water and gas in the catalyst layer from the equations of gas transportation and water production transportation phase change, obtains distribution of temperature in the catalyst layer from the equation of heat conduction, and obtains distribution of current in the catalyst layer from the equations of electric conduction and catalytic reaction.

8. A method for manufacturing a fuel cell including a membrane-electrode assembly having an electrolyte membrane, a pair of catalyst layers sandwiching the electrolyte membrane, and a pair of diffusion layers sandwiching both outer surface of the pair of catalyst layers, the method comprising:

providing a fuel cell simulator having a CPU with a model creation unit for modeling the catalyst layer from geometry and physical property data of the catalyst layer, the geometry data being in the form of at least one of a particle size of a catalyst metal forming the catalyst layer, a particle size of a carbon forming the catalyst layer and an ionomer ratio; and the CPU also having a calculation unit for calculating at least one of power generation state distribution and macro physical property values of the catalyst layer by using a catalyst layer model and establishing simultaneous equations of gas transportation, water production transportation phase change, electric conduction, heat conduction, and catalytic reaction, calculating a power generation state distribution of the catalyst layer using the fuel cell simulator;

wherein the model creation unit models the electrolyte membrane and the diffusion layer from geometry and property data of the electrolyte membrane and the diffusion layer, and the calculation unit calculates at least one of power generation state distribution and macro physical property values of the electrolyte membrane and the diffusion layer by using an electrolyte membrane model and a diffusion layer model and establishing simultaneous equations of gas transportation, water production transportation phase change, electric conduction, heat conduction and catalytic reaction, determining geometry and physical property data of the catalyst layer based on the power generation state distribution; and manufacturing the fuel cell having the determined geometry physical property data.

9. A fuel cell simulator for predicting power generation performance of a fuel cell including a membrane-electrode assembly having an electrolyte membrane, a catalyst layer, and a diffusion layer, the fuel cell simulator comprising:

a CPU having a model creation unit for modeling the catalyst layer from geometry and property data of the catalyst layer, the geometry data being in the form of at least one of a particle size of a catalyst metal forming the catalyst layer, a particle size of a carbon forming the catalyst layer and an ionomer ratio;

the CPU also having a calculation unit for calculating at least one of power generation state distribution and macro physical property values of the catalyst layer by using a catalyst layer model and establishing simultaneous equations of gas transportation, water production transportation phase change, electric conduction, heat conduction, and catalytic reaction; and the CPU also having a repetition unit for causing the model creation unit to repeat modeling and causing the calculation unit to repeat calculation by varying the geometry and the property data such that a difference between a calculation result by the calculation unit and a target value is a predetermined value or less.

* * * * *